UNITED STATES PATENT OFFICE.

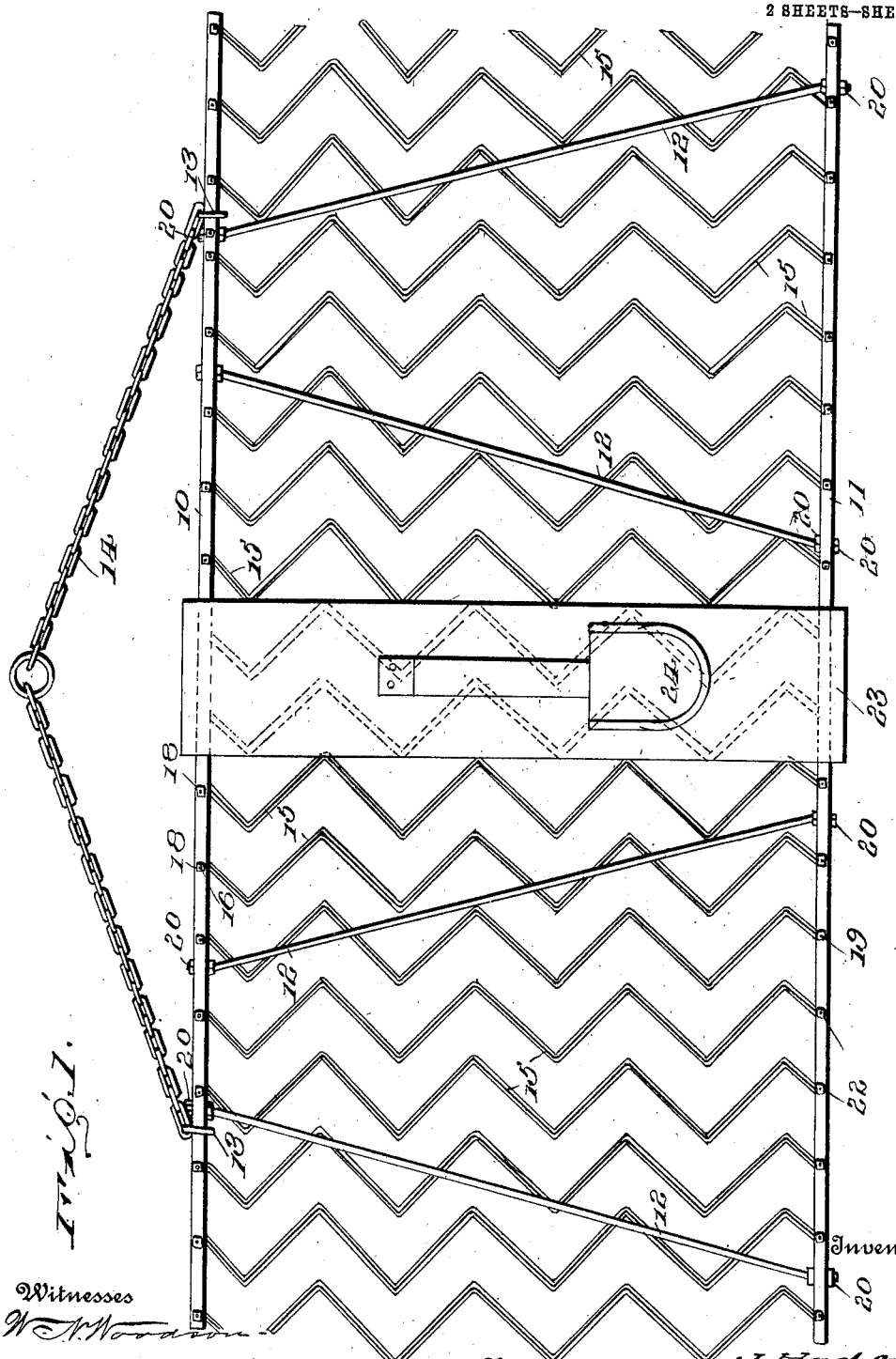

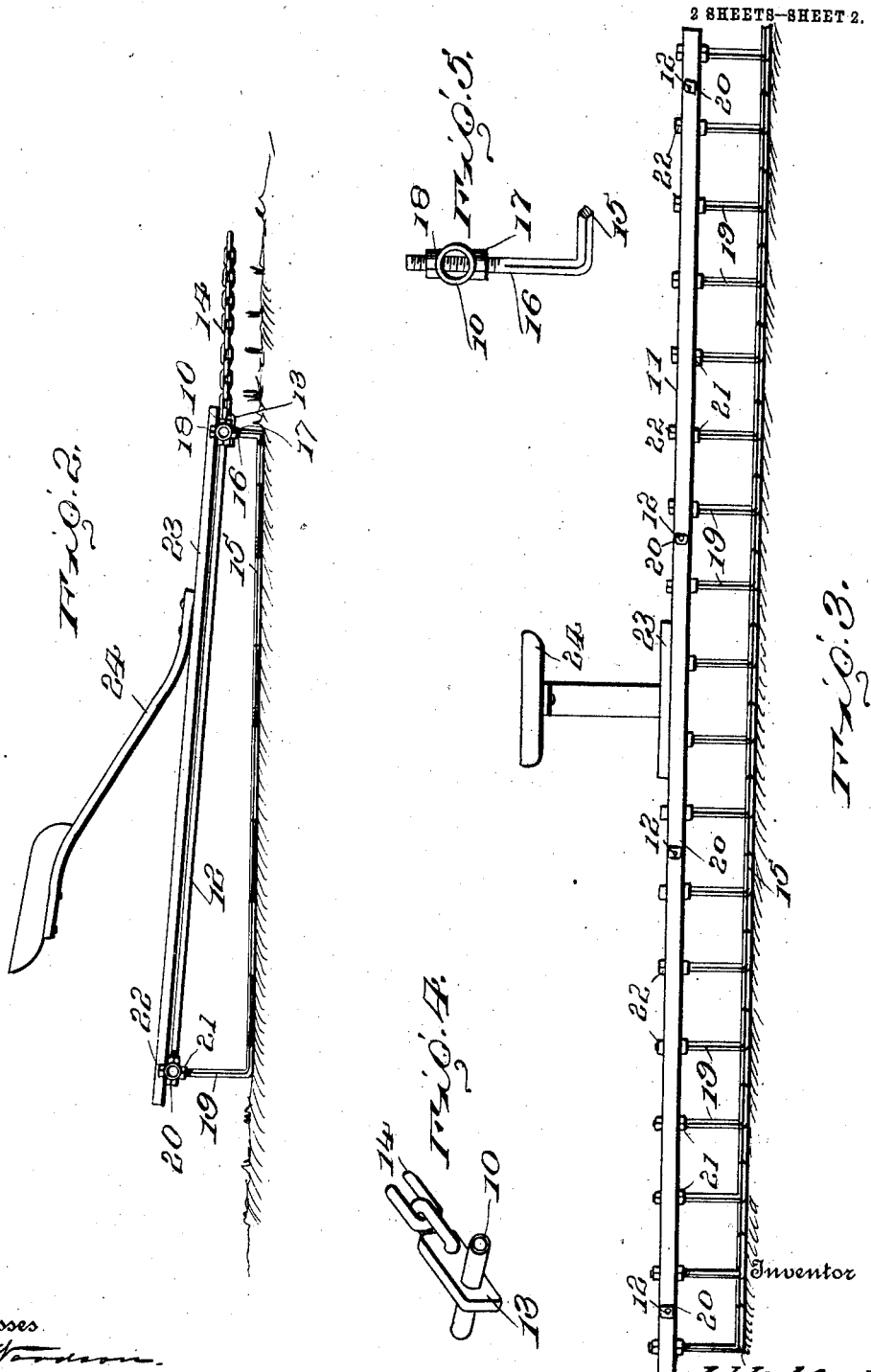

JOHN HADFORD, OF WAUKON, WASHINGTON.

DRAG-HARROW.

1,002,681. Specification of Letters Patent. Patented Sept. 5, 1911.

Application filed November 30, 1910. Serial No. 594,911.

*To all whom it may concern:*

Be it known that I, JOHN HADFORD, citizen of the United States, residing at Waukon, in the county of Lincoln and State of Washington, have invented certain new and useful Improvements in Drag-Harrows, of which the following is a specification.

This invention relates to drag harrows and has for an object to provide a peculiarly constructed harrow adapted particularly to the cultivation of timothy meadows.

The invention has for another object to provide an improved drag harrow which not only levels the surface of the earth but which thoroughly pulverizes and disintegrates the soil to offset to a large extent the hardening of the earth and the forming of the same into sod after seeding.

For a full understanding of the invention reference is to be had to the following description and accompanying drawing, in which:—

Figure 1 is a top plan view of the complete harrow. Fig. 2 is a side elevation of the same. Fig. 3 is a rear elevation of the harrow. Fig. 4 is a detail perspective view of the connector and its adjacent parts. Fig. 5 is a sectional view of the forward bar of the frame showing the scraper arm attached thereto.

Corresponding and like parts are referred to in the following description and indicated in all the views of the accompanying drawing by the same reference characters.

Referring to the drawing the numerals 10 and 11 designate the forward and rear bars of the frame which are preferably in the form of piping and extend across the entire width of the harrow. The bars 10 and 11 are held in spaced relation by the provision of a plurality of diagonal braces 12 which are suitably arranged therebetween. The forward bar 10 carries adjacent to its opposite ends connectors 13 which are in the form of short plates having enlarged openings through their inner ends to receive the bar 10 and which are provided with reduced openings at their outer ends for the reception of the extremities of a draft-chain 14.

The frame-bars 10 and 11 carry a plurality of longitudinally spaced scrapers 15. The scrapers 15 each comprise an elongated bar which is angular in cross-section and bent into serpentine form having the angles thereof disposed in the same horizontal plane. The scraper 15 presents one of its edges against the ground. The forward end of each of the scrapers 15 is provided with an upturned arm 16 rounded and threaded at its upper end and engaging through a corresponding opening formed in the forward frame bar 10. A collar 17 is carried upon the upper end of the arm 16 for engagement against the under side of the frame-bar 10 while a clamping nut 18 is disposed in threaded engagement upon the upper extremity of the arm 16.

The rear end of the scraper 15 is provided with an upturned arm 19 which is rounded and threaded at its upper end and engages through the rear frame-bar 11. A collar 21 is carried upon the arm 19 for engagement against the underside of the frame-bar 11 and a binding nut 22 is carried upon the upper extremity of the arm 19 and against the upper face of the frame-bar 11. It will thus be seen that the serpentine portion of the scraper 15 is disposed in a horizontal plane spaced below the plane of the bars 10 and 11.

A platform or longitudinally spaced beam 23 engages across the central portions of the bars 10 and 11 and is suitably secured thereto. A seat 24 is mounted upon the platform 23. Adjusting nuts 20 are carried upon the ends of the diagonal braces 12 and bind against the opposite sides of the frame-bars 10 and 11.

From Fig. 1 it will be noted that the serpentine scrapers are spaced apart in the frame in such a manner that the adjacent angular portions thereof slightly overlap one another insuring the tossing of the earth between the angular portions of the scrapers.

This improved scraper or harrow can be employed in leveling gravel, or the like, in the construction of roads, as well as in the capacity of a farm implement.

It will be observed from Fig. 2 that the scraper arms 16 are of reduced length as compared to the rear arms 19 in order to slant the frame of the harrow forwardly and direct the weight of the same upon the forward ends of the scrapers 15. The forward pitch of the frame is adapted to distribute the weight of the harrow when in motion, more evenly over the ground surface.

Having thus described the invention what is claimed as new is:—

1. A drag harrow including a horizontal frame, a plurality of spaced serpentine scrapers arranged in the frame and having upturned arms at their extremities to space the scrapers below the same, and a draft-chain attached to the forward end of the frame.

2. A drag harrow including spaced transverse bars, diagonal braces arranged between the bars, a plurality of serpentine scrapers having their angular portions arranged in a horizontal plane and having upturned arms at their extremities engaging through the side-bars, a pair of spaced connector plates carried upon the forward one of the side-bars, and a draft-chain attached to the connectors.

3. A drag harrow including a plurality of longitudinally arranged and transversely spaced scrapers angular in cross-section and having upturned arms at their opposite ends, and a frame mounted upon the upper ends of the upturned arms and being inclined forwardly over the scrapers.

4. A drag harrow including a forwardly inclined frame, a plurality of serpentine scrapers arranged longitudinally and in transverse spaced relation beneath the frame and having upturned arms at its opposite ends engaging through the frame, a platform carried over the central portion of the frame, and a seat mounted upon the platform.

5. A drag harrow including a forwardly inclined frame, a plurality of serpentine scrapers arranged longitudinally and in transverse spaced relation beneath the frame and having upturned arms at their opposite ends engaging through the frame, and binding nuts carried upon the upper ends of the arms and engaging with the frame to hold the scrapers firmly thereon.

6. A drag harrow including longitudinally spaced bars, diagonal braces carried across the bars, a platform disposed centrally over the bars, a seat mounted upon the platform, connector plates carried adjacent to the ends of the forward bar, a draft chain carried upon the connector plates, a plurality of scrapers disposed beneath the frame and having angular lower edges engaging against the ground, the scrapers being bent into serpentine form and having their angular portions lying in the same horizontal portion, the scrapers being also provided with upturned arms at their ends engaging through the spaced bars of the frame, and binding nuts carried upon the upper ends of the upturned arms and engaging against the bars of the frame.

7. A drag harrow including spaced transverse bars, braces connecting the bars, and a plurality of spaced serpentine scrapers disposed longitudinally beneath the bars and having upturned arms secured to the bars.

In testimony whereof, I affix my signature in presence of two witnesses.

JOHN HADFORD. [L. S.]

Witnesses:
 B. W. Hughes,
 F. H. Kirchhoffer.

---

Copies of this patent may be obtained for five cents each, by addressing the "Commissioner of Patents, Washington, D. C."